United States Patent
Jeon et al.

(10) Patent No.: US 10,170,796 B2
(45) Date of Patent: Jan. 1, 2019

(54) LITHIUM SECONDARY BATTERY OF IMPROVED RATE CAPABILITY WITH CATHODE CONTAINING NICKEL MANGANESE COMPLEX OXIDE FOR HIGH-VOLTAGE APPLICATIONS

(71) Applicant: LG Chem, Ltd., Seoul (KR)

(72) Inventors: Jong Ho Jeon, Daejeon (KR); Yoo Seok Kim, Daejeon (KR); Doo Kyung Yang, Daejeon (KR); Shulkee Kim, Daejeon (KR)

(73) Assignee: LG Chem, Ltd. (KR)

( * ) Notice: Subject to any disclaimer, the term of this patent is extended or adjusted under 35 U.S.C. 154(b) by 89 days.

(21) Appl. No.: 14/813,604

(22) Filed: Jul. 30, 2015

(65) Prior Publication Data

US 2015/0340740 A1 Nov. 26, 2015

Related U.S. Application Data

(63) Continuation of application No. 14/022,681, filed on Sep. 10, 2013, which is a continuation of application No. PCT/KR2013/003294, filed on Apr. 18, 2013.

(30) Foreign Application Priority Data

Apr. 20, 2012 (KR) .................. 10-2012-0041297

(51) Int. Cl.
- H01M 10/05 (2010.01)
- H01M 10/0569 (2010.01)
- H01M 4/485 (2010.01)
- H01M 10/052 (2010.01)
- H01M 4/505 (2010.01)
- H01M 10/0525 (2010.01)

(52) U.S. Cl.
CPC ....... H01M 10/0569 (2013.01); H01M 4/485 (2013.01); H01M 4/505 (2013.01); H01M 10/052 (2013.01); H01M 10/0525 (2013.01); H01M 2220/20 (2013.01); H01M 2300/0037 (2013.01); Y02T 10/7011 (2013.01)

(58) Field of Classification Search
None
See application file for complete search history.

(56) References Cited

U.S. PATENT DOCUMENTS

| | | |
|---|---|---|
| 5,545,468 A | 8/1996 | Koshiba et al. |
| 7,476,467 B2 | 1/2009 | Park et al. |
| 2005/0123834 A1 | 6/2005 | Noguchi et al. |
| 2005/0191551 A1 | 9/2005 | Tsujimoto et al. |
| 2006/0046155 A1 | 3/2006 | Inagaki et al. |
| 2007/0178386 A1 | 8/2007 | Takeda |
| 2010/0119954 A1 | 5/2010 | Chiga et al. |
| 2010/0266905 A1 | 10/2010 | Jeon et al. |
| 2011/0111305 A1 | 5/2011 | Jeon et al. |
| 2011/0165472 A1 | 7/2011 | Kim et al. |
| 2011/0206999 A1 | 8/2011 | Jeon et al. |
| 2012/0231325 A1* | 9/2012 | Yoon ........... H01M 10/052 429/163 |

FOREIGN PATENT DOCUMENTS

| | | |
|---|---|---|
| CN | 1320980 A | 11/2001 |
| CN | 1744368 A | 3/2006 |
| CN | 101034764 A | 9/2007 |
| CN | 101803101 A | 8/2010 |
| EP | 1487039 A1 | 12/2004 |
| JP | 2001-210324 A | 8/2001 |
| JP | 2001210324 A | 8/2001 |
| JP | 2008-050259 A | 3/2008 |
| JP | 2008-282618 A | 11/2008 |
| JP | 5074490 B2 | 11/2012 |
| KR | 10-0262852 B1 | 8/2000 |
| KR | 20090018003 A | 2/2009 |
| TW | 248617 B | 6/1995 |
| TW | 2005041141 | 12/2005 |
| WO | 2008153309 A1 | 12/2008 |
| WO | 2009035222 A1 | 3/2009 |
| WO | 2009084928 | 10/2009 |

OTHER PUBLICATIONS

Cho, et al., "Comparison of Metal Ion Dissolutions from Lithium Ion Battery Cathodes." Journal of The Electrochemical Society, 153 (9), 2006, pp. A1760-A1764.

(Continued)

*Primary Examiner* — Ula C Ruddock
*Assistant Examiner* — Tony S Chuo
(74) *Attorney, Agent, or Firm* — Lerner, David, Littenberg, Krumholz & Mentlik, LLP

(57) ABSTRACT

Disclosed is a lithium secondary battery with improved rate characteristics. More particularly, disclosed is a lithium secondary battery including a cathode, an anode, a separator disposed between the cathode and the anode, and an electrolyte, wherein the electrolyte includes a mixed solvent of a cyclic carbonate-based material and a propionate-based material, the cathode includes a lithium manganese composite oxide represented by Formula 1 below as a cathode active material, and the anode includes a lithium metal oxide represented by Formula 2 below as an anode active material:

$$Li_xM_yMn_{2-y}O_{4-z}A_z \qquad (1)$$

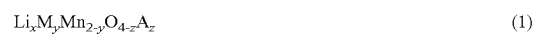

wherein $0.9 \leq x \leq 1.2$, $0 < y < 2$, and $0 \leq z < 0.2$; M is at least one element selected from the group consisting of Al, Mg, Ni, Co, Fe, Cr, V, Ti, Cu, B, Ca, Zn, Zr, Nb, Mo, Sr, Sb, W, Ti, and Bi; and A is at least one monovalent or divalent anion.

$$Li_aM'_bO_{4-c}A_c \qquad (2)$$

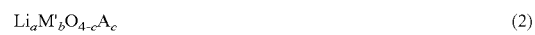

wherein M' is at least one element selected from the group consisting of Ti, Sn, Cu, Pb, Sb, Zn, Fe, In, Al, and Zr; $0.1 \leq a \leq 4$ and $0.2 \leq b \leq 4$ wherein a and b are determined according to oxidation number of M'; $0 \leq c < 0.2$ wherein c is determined according to oxidation number of A; and A is at least one monovalent or divalent anion.

10 Claims, No Drawings

(56) References Cited

OTHER PUBLICATIONS

Augustus H. Gill, et al., "Viscosity of Esters of Saturated Aliphatic Acids Relation to the Synthesis of Fine Lubricating Oils." Ind. Eng. Chem., 1934, 26(8), pp. 881.
M. C. Smart, et al., "Use of Organic Esters as Cosolvents in Electrolytes for Lithium-Ion Batteries with Improved Low Temperature Performance." Journal of the Electrochemical Society, (Jan. 1, 2002) vol. 149, vol. 4, A361.
Extended Search Report from European Application No. 13778107.6, dated Jul. 14, 2015.
International Search Report from PCT/KR2013/003294, dated Jul. 12, 2013.

* cited by examiner

LITHIUM SECONDARY BATTERY OF IMPROVED RATE CAPABILITY WITH CATHODE CONTAINING NICKEL MANGANESE COMPLEX OXIDE FOR HIGH-VOLTAGE APPLICATIONS

CROSS-REFERENCE TO RELATED APPLICATIONS

The present application is a continuation of U.S. patent application Ser. No. 14/022,681, filed Sep. 10, 2013, now abandoned, which is a continuation of International Application No. PCT/KR2013/003294 filed Apr. 18, 2013, which claims the benefit of the filing date of Korean Patent Application No. 10-2012-0041297 filed Apr. 20, 2012, the disclosures of which are hereby incorporated herein by reference.

TECHNICAL FIELD

The present invention relates to a lithium secondary battery with improved rate characteristics. More specifically, the present invention relates to a lithium secondary battery including a cathode, an anode, a separator disposed between the cathode and the anode, and an electrolyte, wherein the electrolyte includes a mixed solvent of a cyclic carbonate-based material and a propionate-based material, the cathode includes a lithium manganese composite oxide having a particular formula as a cathode active material, and the anode includes a lithium metal oxide having a particular formula as an anode active material.

BACKGROUND ART

As mobile device technology continues to develop and demand therefor continues to increase, demand for secondary batteries as energy sources is rapidly increasing. Among these secondary batteries, lithium secondary batteries, which exhibit high energy density and operating potential, have long cycle lifespan, and have a low self-discharge rate, are commercially available and widely used.

In addition, as recent interest in environmental problems is increasing, research into electric vehicles (EVs), hybrid electric vehicles (HEVs), and the like that can replace vehicles using fossil fuels, such as gasoline vehicles, diesel vehicles, and the like, which are one of the main causes behind air pollution, is underway. As a power source of EVs, HEVs, and the like, a nickel metal-hydride (Ni-MH) secondary battery is mainly used. However, research into lithium secondary batteries having high energy density, high discharge voltage, and high output stability is actively carried out and some of the lithium secondary batteries are commercially available.

A lithium secondary battery has a structure in which an electrode assembly, which includes: a cathode prepared by coating a cathode active material on a cathode current collector; an anode prepared by coating an anode active material on an anode current collector; and a porous separator disposed between the cathode and the anode, is impregnated with a lithium salt-containing non-aqueous electrolyte.

These lithium secondary batteries generally use metal oxides as a cathode active material, such as lithium cobalt-based oxides, lithium manganese-based oxides, lithium nickel-based oxides, and the like and carbonaceous materials as an anode active material, and such lithium secondary battery is manufactured by disposing a polyolefin-based porous separator between an anode and a cathode and impregnating the resultant structure with a non-aqueous electrolyte containing a lithium salt such as $LiPF_6$ or the like. When the lithium secondary battery is charged, lithium ions of the cathode active material are deintercalated and then are intercalated into a carbon layer of the anode. When the lithium secondary battery is discharged, the lithium ions of the carbon layer are deintercalated and then are intercalated into the cathode active material. In this regard, the non-aqueous electrolyte acts as a medium through which lithium ions migrate between the anode and the cathode.

Such electrolyte basically requires stability within an operating voltage range of a battery, i.e., 0 to 4.2 V, and the capability to transfer ions at a sufficiently high rate. To satisfy the requirements, a mixed solvent prepared by appropriately mixing a cyclic carbonate compound such as ethylene carbonate, propylene carbonate, or the like, with a linear carbonate compound such as dimethyl carbonate, ethylmethyl carbonate, diethyl carbonate, or the like is used as an electrolyte solvent.

However, lithium secondary batteries have high operating potentials and thus high energy may instantaneously flow therein. Accordingly, when a lithium secondary battery is overcharged to 4.2 V or higher, the electrolyte starts to decompose, and when the temperature of the electrolyte increases, the electrolyte may readily reach an ignition point, which results in high possibility of combustion.

In addition, recently, instead of using conventional materials as electrode active materials, research into use of spinel-structure lithium manganese composite oxides as cathode active materials or use of lithium metal oxides, e.g., lithium titanium oxides as anode active materials is underway.

In particular, among lithium manganese composite oxides, spinel-structure lithium nickel manganese composite oxides having formula $Li_xNi_yMn_{2-y}O_4$, where y=0.01 to 0.6, which are used as active materials for high-voltage applications since they have an average voltage of 4.7 V, reach oxidation potential of an electrolyte and thus the electrolyte is oxidized, resulting in generation of by-products such as gas and the like, which deteriorates secondary battery safety.

Therefore, there is a need to develop an electrolyte that does not cause these problems, is stable at high voltages, and improves rate characteristics.

DISCLOSURE

Technical Problem

Therefore, the present invention has been made to solve the above problems and other technical problems that have yet to be resolved.

As a result of a variety of extensive and intensive studies and experiments, the inventors of the present invention found that, as described below, when an electrolyte including a mixed solvent of a cyclic carbonate-based material and a propionate-based material is applied to a lithium secondary battery that includes a lithium manganese composite oxide as a cathode active material and a lithium metal oxide as an anode active material, desired effects can be achieved, thus completing the present invention.

Technical Solution

In accordance with one aspect of the present invention, provided is a lithium secondary battery including a cathode, an anode, a separator disposed between the cathode and the anode, and an electrolyte, wherein the electrolyte includes a mixed solvent of a cyclic carbonate-based material and a propionate-based material, the cathode includes a lithium manganese composite oxide represented by Formula 1 below as a cathode active material, and the anode includes a lithium metal oxide represented by Formula 2 below as an anode active material:

$$Li_xM_yMn_{2-y}O_{4-z}A_z \quad (1)$$

wherein $0.9 \leq x \leq 1.2$, $0 < y < 2$, $0 \leq z < 0.2$; M is at least one element selected from the group consisting of Al, Mg, Ni, Co, Fe, Cr, V, Ti, Cu, B, Ca, Zn, Zr, Nb, Mo, Sr, Sb, W, Ti, and Bi; and A is at least one monovalent or divalent anion, and $$Li_aM'_bO_{4-c}A_c \quad (2)$$

wherein M' is at least one element selected from the group consisting of Ti, Sn, Cu, Pb, Sb, Zn, Fe, In, Al, and Zr; $0.1 \leq a \leq 4$ and $0.2 \leq b \leq 4$ wherein a and b are determined according to oxidation number of M'; $0 \leq c < 0.2$ wherein c is determined according to oxidation number of A; and A is at least one monovalent or divalent anion.

In general, in a secondary battery that uses graphite as an anode active material and, as an electrolyte solvent, a mixed solvent including a low-viscosity linear carbonate, e.g., dimethyl carbonate (DMC), ethyl methyl carbonate (EMC), or diethyl carbonate (DEC) and a cyclic carbonate, when the electrolyte includes 30 wt % or less of the cyclic carbonate, problems in terms of formation of an anode protective film (e.g., solid electrolyte interface (SEI) film) occur and thus lifespan characteristics are dramatically deteriorated. In addition, when a linear ester is used instead of the linear carbonate, reduction at the anode excessively occurs relative to a carbonate-based low-viscosity solvent, and thus, there is a need to use a large amount of the cyclic carbonate or use an additive for forming an anode protective film, such as vinylene carbonate (VC) or the like.

However, the inventors of the present invention confirmed that when the same composition as that of the above-described electrolyte is applied to a secondary battery that uses a lithium manganese composite oxide as a cathode active material and a lithium metal oxide as an anode active material, problems occur as follows.

First, when the lithium manganese composite oxide is used as a cathode active material, a cathode is driven at a high voltage versus lithium and thus the electrolyte is decomposed due to low oxidation voltage of VC and components of the cathode active material, e.g., a transition metal, oxygen, and the like, are eluted and the eluted components are deposited on a surface of the anode, whereby battery performance is deteriorated. Or, secondary problems, such as deterioration of battery performance due to decomposition of components of the electrolyte, e.g., a solvent or a lithium salt, may occur.

Second, when an electrolyte including 30 wt % or more of cyclic carbonate is applied to a lithium secondary battery including the lithium metal oxide as an anode active material used to achieve high-rate charge/discharge characteristics, improvement in rate characteristics is lower than when a smaller amount of the cyclic carbonate is used. As is common knowledge in the art, as conductivity of lithium ions increases, high-rate charge/discharge characteristics of a battery are enhanced. In addition, when the amount of the cyclic carbonate is about 30 wt % or less, e.g., in the range of 10 to 20 wt %, it can be confirmed that ionic conductivity is reduced, whereas rate characteristics are rather enhanced when the electrolyte includes a small amount of the cyclic carbonate.

Thus, the inventors of the present invention repeatedly performed intensive studies and discovered that when the lithium metal oxide is used as an anode active material and the electrolyte including a mixed solvent of a small amount of a cyclic carbonate-based material and a propionate-based material is used, problems in terms of reduction at the anode having high stability for reduction of the electrolyte do not occur due to high reduction potential, and rate characteristics may be enhanced. In addition, the inventors discovered that when a cathode active material for high-voltage application, e.g., the lithium manganese composite oxide, is used, elution of components of the cathode active material and generation of by-products such as carbon dioxide or carbon monoxide due to surface reaction may be suppressed or reduced.

In a specific embodiment, the propionate-based material, which is one of the components of the mixed solvent, may be represented by Formula 3 below:

$$R_1-COO-R_2 \quad (3)$$

wherein $R_1$ is a substituted or unsubstituted ethyl group, and $R_2$ is a substituted or unsubstituted $C_1$-$C_4$ linear or branched alkyl group.

For example, the propionate-based material may be selected from the group consisting of methyl propionate (MP), ethyl propionate (EP), propyl propionate (PP), butyl propionate (BP), and combinations thereof. More specifically, the propionate-based material may be MP.

The propionate-based material enables appropriate coordination of lithium ions and thus has high ionic conductivity at room temperature and low temperatures. In addition, when the lithium secondary battery is charged, the propionate-based material increases resistance to an electrolyte decomposition reaction, whereby overall performance, in particular rate characteristics, of the battery is enhanced.

In a specific embodiment, the cyclic carbonate-based material constituting the mixed solvent together with the propionate-based material may be selected from the group consisting of ethylene carbonate (EC), propylene carbonate (PC), butylene carbonate (BC), fluoroethylene carbonate (FEC), γ-butyrolactone, and combinations thereof, but is not limited thereto. The cyclic carbonate-based material satisfactorily dissolves lithium ions and thus may increase ionic conductivity of the electrolyte.

In this regard, the amount of the cyclic carbonate-based material may be in the range of 1 wt % to 30 wt % based on a total weight of the electrolyte.

When the amount of the cyclic carbonate-based material is less than 1 wt %, improvement in ionic conductivity, which is a strong point of cyclic carbonate-based materials, is not obtained. On the other hand, when the amount of the cyclic carbonate exceeds 30 wt %, the amount of the propionate-based material is relatively small and thus desired effects, i.e., improvement in rate characteristics and stability of oxidation at a surface of a high-voltage cathode, cannot be achieved.

In a specific embodiment, a mixing weight ratio of the cyclic carbonate-based material to the propionate-based material may be in the range of 5 to 15:85 to 95, and, more specifically, 10:90. The inventors of the present invention discovered that the above-described mixing weight ratio is an optimum range that enables improvement in performance, e.g., charge/discharge characteristics and the like of a secondary battery.

A linear carbonate is not used as one of the essential components of the mixed solvent, but a small amount of the linear carbonate may be used within a scope that does not deviate from the objective of the present invention.

The present invention also provides a method of manufacturing the lithium secondary battery. The method is not much different from manufacturing methods known in the art and, in particular, includes: manufacturing an electrode assembly including a cathode fabricated by coating a cathode active material on a cathode current collector, an anode fabricated by coating an anode active material on an anode current collector, and a porous separator disposed therebetween; and impregnating the electrode assembly with an electrolyte including the mixed solvent.

The electrode assembly may be a jellyroll (winding-type) electrode assembly in which long sheet-shaped cathodes and anodes are wound with separators therebetween, a stack-type electrode assembly in which a plurality of cathodes and anodes cut to have certain sizes are sequentially stacked with separators therebetween; and a stack/folding-type electrode assembly in which Bi-cells or full cells formed by stacking cathodes and anodes having certain sizes with separators therebetween are wound using a long, continuous separator sheet.

The cathode is fabricated by coating a mixture of a cathode active material, a conductive material, and a binder on a cathode current collector and drying and pressing the coated cathode current collector. As desired, the mixture may further include a filler.

As described above, the cathode active material may include a lithium manganese composite oxide. In a specific embodiment, the lithium manganese composite oxide may be a lithium nickel manganese complex oxide (LNMO) represented by Formula 4 below, for example, $LiNi_{0.5}Mn_{1.5}O_4$ or $LiNi_{0.4}Mn_{1.6}O_4$:

$$Li_xNi_yMn_{2-y}O_4 \qquad (4)$$

wherein $0.9 \leq x \leq 1.2$ and $0.4 \leq y \leq 0.5$.

In addition to the lithium manganese composite oxide, the cathode active material may include other active materials. Examples of other active materials include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ where $0 \leq x \leq 0.33$, $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides of Formula $LiNi_{1-x}M_xO_2$ where M=Co, Mn, Al, Cu, Fe, Mg, B, or Ga, and $0.01 \leq x \leq 0.3$; lithium manganese composite oxides of Formula $LiMn_{2-x}M_xO_2$ where M=Co, Ni, Fe, Cr, Zn, or Ta, and $0.01 \leq x \leq 0.1$), or Formula $Li_2Mn_3MO_8$ where M=Fe, Co, Ni, Cu, or Zn; and $LiMn_2O_4$ in which some of the Li atoms are substituted with alkaline earth metal ions; disulfide compounds; and $Fe_2(MoO_4)_3$. In this case, the amount of the lithium manganese composite oxide may be in the range of 40 to 100 wt % based on a total weight of the cathode active material.

The cathode current collector is generally fabricated to a thickness of 3 to 500 μm. The cathode current collector is not particularly limited so long as it does not cause chemical changes in the secondary battery and has high conductivity. For example, the cathode current collector may be made of stainless steel, aluminum, nickel, titanium, sintered carbon, or aluminum or stainless steel that is surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The conductive material is typically added in an amount of 1 to 30 wt % based on the total weight of the mixture including the cathode active material. There is no particular limit as to the conductive material, so long as the conductive material has conductivity and does not cause chemical changes in the fabricated battery. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between the electrode active material and the conductive material and in binding of the electrode active material to the corresponding current collector. The binder is typically added in an amount of 1 to 30 wt % based on the total weight of the mixture including the cathode active material. Examples of the binder include polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The anode is manufactured by coating an anode active material on an anode current collector and drying and pressing the coated anode current collector. In some cases, the conductive material, the binder, the filler, or the like may be further optionally used.

As described above, the anode active material may include a lithium metal oxide. In a specific embodiment, the lithium metal oxide may be lithium titanium oxide (LTO) represented by Formula 5 below, for example, $Li_{0.8}Ti_{2.2}O_4$, $Li_{2.67}Ti_{1.33}O_4$, $LiTi_2O_4$, $Li_{1.33}Ti_{1.67}O_4$, $Li_{1.14}Ti_{1.71}O_4$, or the like, but is not limited thereto. More specifically, the LTO may have a spinel structure with less change in crystal structure during charge/discharge and high reversibility, e.g., $Li_{1.33}Ti_{1.67}O_4$ or $LiTi_2O_4$:

$$Li_aTi_bO_4 \qquad (5)$$

wherein $0.5 \leq a \leq 3$ and $1 \leq b \leq 2.5$.

A method of preparing the lithium titanium oxide of Formula 5 is known in the art. For example, the method includes adding titanium oxide or the like as a titanium source to a solution prepared by dissolving a lithium salt as a lithium source, such as lithium hydroxide, lithium oxide, lithium carbonate, or the like in water according to an atomic percent of lithium to titanium, stirring and drying the mixture to prepare a precursor of the lithium titanium oxide and sintering the prepared precursor.

The anode active material may also include other active materials in addition to the lithium metal oxide. Examples of other active materials include, but are not limited to, carbon such as hard carbon and graphite-based carbon; metal composite oxides such as $Li_xFe_2O_3$ where $0 \leq x \leq 1$, $Li_xWO_2$ where $0 \leq x \leq 1$, and $Sn_xMe_{1-x}Me'_yO_z$ where Me: Mn, Fe, Pb or Ge; Me': Al, B, P, Si, Group I, Group II and Group III elements, or halogens; $0 \leq x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni based materials; titanium oxides. In this case, the amount of the lithium metal oxide may be, for example, 40 to 100 wt % based on a total weight of the anode active material.

The anode current collector is generally fabricated to a thickness of 3 to 500 μm. The anode current collector is not particularly limited so long as it does not cause chemical changes in the fabricated secondary battery and has conductivity. For example, the anode current collector may be made of copper, stainless steel, aluminum, nickel, titanium, sintered carbon, copper or stainless steel that is surface-treated with carbon, nickel, titanium, silver, or the like, or an aluminum-cadmium alloy. In addition, similarly to the cathode current collector, the anode current collector may have fine irregularities at a surface thereof to increase adhesion between the anode active material and the anode current collector. In addition, the anode current collector may be used in any of various forms including films, sheets, foils, nets, porous structures, foams, and non-woven fabrics.

The separator is disposed between the cathode and the anode and, as the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene, glass fibers or polyethylene, which have chemical resistance and hydrophobicity, are used. When a solid electrolyte such as a polymer is employed as the electrolyte, the solid electrolyte may also serve as both the separator and electrolyte.

The lithium salt included in the electrolyte is a material that is readily soluble in the non-aqueous electrolyte. Examples of lithium salts include, but are not limited to, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), or the like.

The present invention also provides a battery module including the lithium secondary battery as a unit battery, a battery pack including the battery module, and a device including the battery pack.

Examples of such devices include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

Effects of Invention

As apparent from the fore-going, a lithium secondary battery according to the present invention uses an electrolyte including a mixed solvent of a cyclic carbonate-based material and a propionate-based material, which is stable even when applied to a lithium secondary battery including a lithium manganese composite oxide, which is used in high-voltage applications, as a cathode active material and a lithium metal oxide having high operating potential as an anode active material, and thus, has enhanced rate characteristics.

BEST MODE

Now, the present invention will be described in more detail with reference to the following examples. These examples are provided only for illustration of the present invention and should not be construed as limiting the scope and spirit of the present invention.

Example 1

$Li_{1.33}Ti_{1.67}O_4$ as an anode active material, Denka black as a conductive material, and PVdF as a binder were added to NMP in a weight ratio of 95:2.5:2.5 and the components were mixed to prepare an anode composite material. Thereafter, the anode composite material was coated on copper foil having a thickness of 20 μm and the coated copper foil was rolled and dried, thereby completing manufacture of an anode.

Separately, $LiNi_{0.5}Mn_{1.5}O_4$ as a cathode active material, Denka black as a conductive material, and PVdF as a binder were added to NMP in a weight ratio of 95:2.5:2.5 and the components were mixed to prepare a cathode composite material. Thereafter, the cathode material was coated on aluminum foil having a thickness of 20 μm and the coated aluminum foil was rolled and dried, thereby completing manufacture of a cathode.

Afterwards, a polyethylene film (Celgard, thickness:20 μm) was disposed as a separator between the anode and the cathode, and a liquid electrolyte containing 1M $LiPF_6$ in a mixed solvent of ethylene carbonate and methyl propionate in a weight ratio of 10:90 was injected thereinto, thereby completing manufacture of a 2016 coin cell.

Example 2

A 2016 coin cell was manufactured in the same manner as in Example 1, except that a liquid electrolyte containing 1M $LiPF_6$ in a mixed solvent of propylene carbonate and methyl propionate in a weight ratio of 10:90 was used.

Comparative Example 1

A 2016 coin cell was manufactured in the same manner as in Example 1, except that a liquid electrolyte containing 1M $LiPF_6$ in a mixed solvent of ethylene carbonate, ethyl methyl carbonate, and dimethyl carbonate in a volume ratio of 30:30:40 was used.

Comparative Example 2

A 2016 coin cell was manufactured in the same manner as in Example 1, except that a liquid electrolyte containing 1M LiPF₆ in a mixed solvent of ethylene carbonate and dimethyl carbonate in a weight ratio of 10:90 was used.

Comparative Example 3

A 2016 coin cell was manufactured in the same manner as in Example 1, except that a liquid electrolyte containing 1M LiPF₆ in a mixed solvent of propylene carbonate and dimethyl carbonate in a weight ratio of 10:90 was used.

Example 3

A 2016 coin cell was manufactured in the same manner as in Example 1, except that a liquid electrolyte containing 1M LiPF₆ in a mixed solvent of ethylene carbonate and methyl propionate in a weight ratio of 30:70 was used.

Comparative Example 4

A 2016 coin cell was manufactured in the same manner as in Example 1, except that a liquid electrolyte containing 1M LiPF₆ in a mixed solvent of ethylene carbonate and methyl propionate in a weight ratio of 50:50 was used.

Experimental Example 1

A rate test was performed on the 2016 coin cells manufactured according to Examples 1 to 3 and Comparative Examples 1 to 4, and results are shown in Table 1 below.

TABLE 1

| | LTO/LNMO (1.5~3.5V, coin full cell) Rate test (1 Crate = 1.49 mA) | | 3C/3C vs. 3C/3C | 5C/5C vs. 3C/3C | 10C/10C vs. 3C/3C | 20C/20C vs. 3C/3C |
|---|---|---|---|---|---|---|
| Example 1 | EC/MP 10:90 wt %, 1M LiPF₆ | 100% 1.49 mAh | 99% | 85% | 50% | |
| Example 2 | PC/MP 10:90 wt %, 1M LiPF₆ | 100% 1.36 mAh | 99% | 79% | 50% | |
| Comparative Example 1 | EC/EMC/DMC 30:30:40 vol %, 1M LiPF₆ | 100%, 1.30 mAh | 95% | 12% | 9% | |
| Comparative Example 2 | EC/DMC 10:90 wt %, 1M LiPF₆ | 100% 1.48 mAh | 99% | 56% | 17% | |
| Comparative Example 3 | PC/DMC 10:90 wt %, 1M LiPF₆ | 100% 1.47 mAh | 98% | 51% | 14% | |
| Example 3 | EC/MP 30:70 wt %, 1M LiPF₆ | 100% 1.47 mAh | 98% | 63% | 12% | |
| Comparative Example 4 | EC/MP 50:50 wt %, 1M LiPF₆ | 100% 1.47 mAh | 96% | 10% | 7% | |

Referring to Table 1, it can be confirmed that the 2016 coin cells of Examples 1 and 2 that use MP, which is a propionate-based material, exhibit superior rate characteristics to those of the 2016 coin cells of Comparative Examples 1 to 3 that use DMC, which is a linear carbonate-based material.

In addition, by comparison between the 2016 coin cells of Examples 1 to 3 and the 2016 coin cell of Comparative Example 4, it can be confirmed that when the amount of EC, which is a cyclic carbonate-based material, is 30 wt % or less, the coin cells including EC within the above-described range exhibit superior rate characteristics. This is assumed to be because ion mobility decreases since the amount of the propionate-based material relatively decreases as the amount of the cyclic carbonate-based material increases, and, in particular, when the amount of the cyclic carbonate-based material is above a certain amount, dissociation of lithium ions decreases.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A lithium secondary battery comprising a cathode, an anode, a separator disposed between the cathode and the anode, and an electrolyte,
   wherein the electrolyte comprises a mixed solvent of a cyclic carbonate-based material and a propionate-based material, the cathode comprises a lithium manganese composite oxide represented by Formula 1 below as a cathode active material, and the anode comprises a lithium metal oxide represented by Formula 2 below as an anode active material:

$$Li_xM_yMn_{2-y}O_{4-z}A_z \qquad (1)$$

wherein $0.9 \leq x \leq 1.2$, $0 < y < 2$, and $0 \leq z < 0.2$; M is at least one element selected from the group consisting of Al, Mg, Ni, Co, Fe, Cr, V, Ti, Cu, B, Ca, Zn, Zr, Nb, Mo, Sr, Sb, W, Ti, and Bi; and A is at least one monovalent or divalent anion, $$Li_aM'_bO_{4-c}A_c \qquad (2)$$

wherein M' is at least one element selected from the group consisting of Ti, Sn, Cu, Pb, Sb, Zn, Fe, In, Al, and Zr; $0.1 \leq a \leq 4$ and $0.2 \leq b \leq 4$ wherein a and b are determined according to oxidation number of M'; $0 \leq c < 0.2$ wherein c is determined according to oxidation number of A; and A is at least one monovalent or divalent anion,
   wherein an amount of the cyclic carbonate-based material is in a range of 1 wt % to 30 wt % based on a total weight of the electrolyte,
   wherein a mixing weight ratio of the cyclic carbonate-based material to the propionate-based material is in a range of 5 to 10:90 to 95,
   wherein the lithium manganese composite oxide of Formula 1 is a lithium nickel manganese complex oxide (LNMO) represented by Formula 4 below:

$$Li_xNi_yMn_{2-y}O_4 \qquad (4)$$

wherein $0.9 \leq x \leq 1.2$ and $0.4 \leq y \leq 0.5$, and
   wherein the lithium metal oxide of Formula 2 is a lithium titanium oxide (LTO) represented by Formula 5 below:

$$Li_aTi_bO_4 \qquad (5)$$

wherein $0.5 \leq a \leq 3$ and $1 \leq b \leq 2.5$.

2. The lithium secondary battery according to claim 1, wherein the propionate-based material is represented by Formula 3 below:

$$R_1-COO-R_2 \qquad (3)$$

wherein $R_1$ is a substituted or unsubstituted ethyl group, and $R_2$ is a substituted or unsubstituted $C_1$-$C_4$ linear or branched alkyl group.

3. The lithium secondary battery according to claim 1, wherein the propionate-based material is one selected from methyl propionate (MP), ethyl propionate (EP), propyl propionate (PP), butyl propionate (BP), or combinations thereof.

4. The lithium secondary battery according to claim 1, wherein the mixing weight ratio of the cyclic carbonate-based material to the propionate-based material is 10:90.

5. The lithium secondary battery according to claim 1, wherein the lithium nickel manganese composite oxide of Formula 4 is $LiNi_{0.5}Mn_{1.5}O_4$ or $LiNi_{0.4}Mn_{1.6}O_4$.

6. The lithium secondary battery according to claim 1, wherein the lithium titanium oxide of Formula 5 is $Li_{1.33}Ti_{1.67}O_4$ or $LiTi_2O_4$.

7. A battery module comprising the lithium secondary battery according to claim 1 as a unit cell.

8. A battery pack comprising the battery module according to claim 7.

9. A device comprising the battery pack according to claim 8.

10. The device according to claim 9, wherein the device is an electric vehicle, a hybrid electric vehicle, a plug-in hybrid electric vehicle, or a system for storing power.

* * * * *